J. PALMER.
Power-Hammers.
No. 5,381. Reissued April 29, 1873.
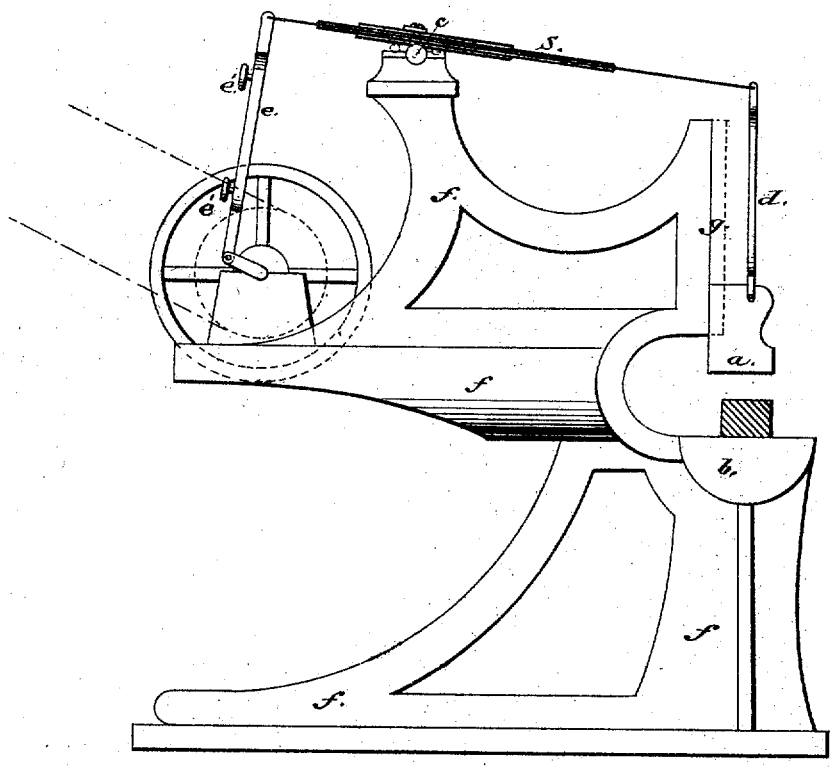
Attest;
M. M. Chandler
C. D. Parlan
Inventor;
Joseph Palmer
per. J. P. Town
Att.
AM. PHOTO-LITHOGRAPHIC CO. N.Y. (OSBORNE'S PROCESS)

UNITED STATES PATENT OFFICE.

JOSEPH PALMER, OF CONCORD, NEW HAMPSHIRE.

IMPROVEMENT IN POWER-HAMMERS.

Specification forming part of Letters Patent No. 122,647, dated January 9, 1872; reissue No. 5,381, dated April 29, 1873; application filed April 11, 1873.

*To all whom it may concern:*

Be it known that I, JOSEPH PALMER, of the city of Concord and State of New Hampshire, have invented certain new and useful Improvements in Power-Hammers; and I do hereby declare that the following is a full, clear, and exact description thereof, which will enable others skilled in the art to which it appertains to make and use the same, reference being had to the accompanying drawing and to the letters of reference marked thereon which form a part of this specification.

This invention relates to that class of power-hammers in which great rapidity of stroke is sometimes required; and it consists in the construction and combination of parts, as will be hereinafter fully described.

The accompanying drawing is a sectional view of my improved hammer, to which reference is made in the following description.

The frame of my machine is constructed of cast-iron, and may be in the form marked *f f* in the drawing, or in any other shape or form which may be found most convenient for the special work to which it is to be applied, and provided with an anvil, *b*, and the hammer *a*, which moves up and down in a dovetail groove, *g*, in the face of the frame *f*, said groove guiding the hammer in its stroke. The hammer is suspended upon the end of the spring S by the connecting-rod *d*, and the spring S works upon the pivot or fixed bearing *c*. The other end of the springs S is attached to the crank or other motive-power by another connecting-rod, *e*, which is provided with a device for lengthening and shortening at pleasure, *e′ e′*.

It will be seen that by a rapid revolution of the crank the hammer will be thrown up and down, and the flexibility of the spring will give a sharp powerful stroke upon the anvil or material to be operated upon. The springs S may be made with one or more leaves, as may be required for machines of different sizes, and by heavy or light hammers, and the stroke of the hammer may be adjusted to the thickness of the work by lengthening or shortening the connecting-rod *e* by means of the screws *e′ e′*.

I claim as my invention—

1. The combination of the hammer *a*, spring S, and the crank, as and for the purpose set forth.

2. The combination of hammer *a*, spring S, connecting-rods *d* and *e*, and crank, as and for the purpose set forth.

JOSEPH PALMER.

Witnesses:
L. D. STEVENS,
H. W. STEVENS.